M. FISCHER.
VALVE FOR MOTORS.
APPLICATION FILED MAY 8, 1912.

1,129,461.

Patented Feb. 23, 1915.

WITNESSES:
John C. Sanders
John A. Percival

INVENTOR:
Martin Fischer
BY Wallace White
ATTY.

UNITED STATES PATENT OFFICE.

MARTIN FISCHER, OF ZURICH, SWITZERLAND, ASSIGNOR TO FISCHER MOTOR CORPORATION, A CORPORATION OF NEW YORK.

VALVE FOR MOTORS.

1,129,461.  Specification of Letters Patent.  Patented Feb. 23, 1915.

Application filed May 8, 1912. Serial No. 695,807.

*To all whom it may concern:*

Be it known that I, MARTIN FISCHER, citizen of Switzerland, residing at Zurich, Switzerland, have invented new and useful Improvements in Valves for Motors, of which the following is a specification.

The present invention relates to a slide valve gear for explosion motors, in which slide valves reciprocate and more particularly those constructions in which valves are reciprocated in a direction substantially parallel with the axis of the cylinder. In the particular form in which I have shown an embodiment of my invention such valves reciprocate along the inner surface of the cylinder in recesses particularly adapted therefor.

The invention consists of the arrangement and form of the slide valves, which are provided with guide-faces and forced against their faces by means pressing against them from within the cylinder, and therefore pack automatically in their seat which in the form shown is a recess in the wall of the cylinder. The cross-sections of the slide valves are such, that the faces facing away from the cylinder, consist of straight surfaces while at least one of the surfaces may be a plane surface.

Figure 1:
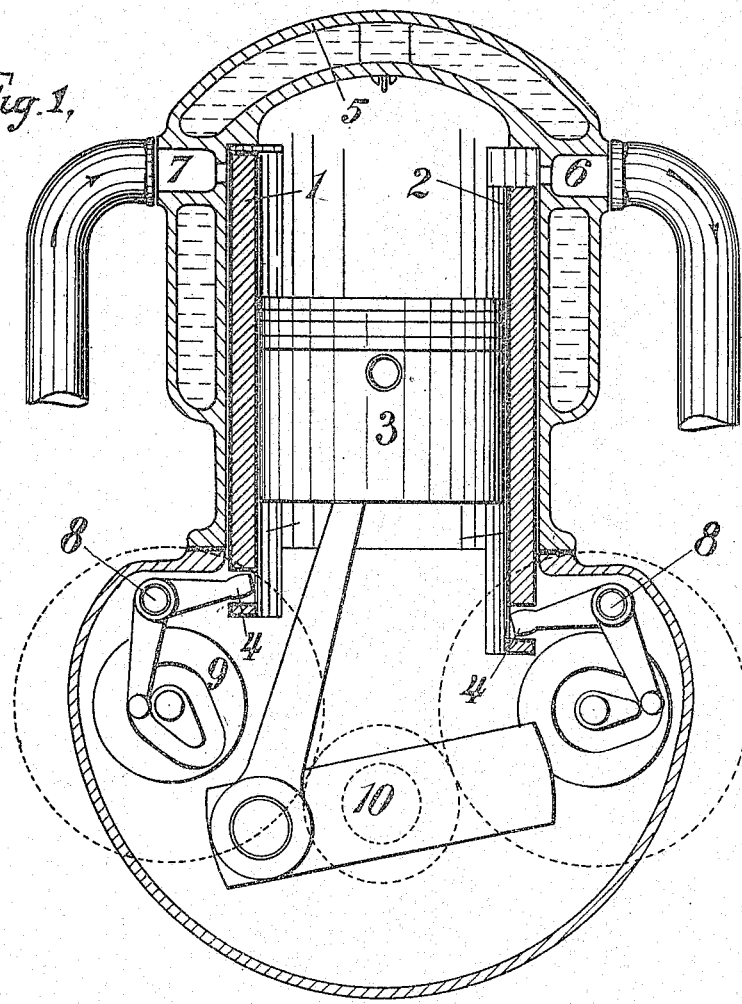
Figure 2:
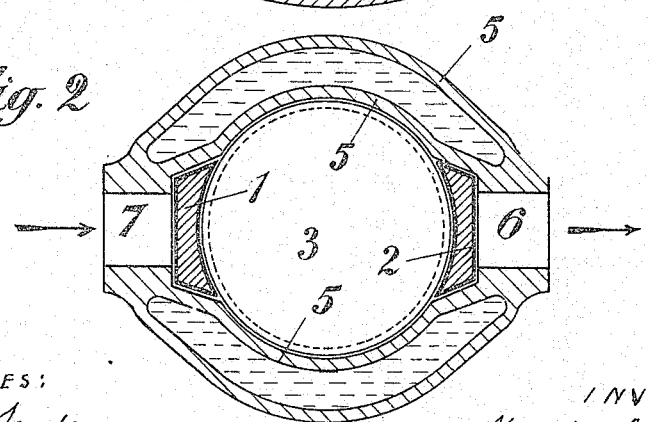

Figure 1 is a vertical section of the cylinder and crank-case of an internal combustion engine; Fig. 2 is a transverse section of the cylinder.

In the drawing 1 and 2 are the slide valves, the inner surfaces of which conform to the outer surface of the piston 3, while the piston is supported as shown in Fig. 2 by the solid portion of the inner walls of the cylinder 3. At their bottom ends the slide valves each have a recess 4, in which bell crank levers turning around stud or shaft 8 engage, and which are moved by cams 9.

5 is the body of the cylinder and 6 and 7 are the outlet and inlet openings.

The inner surfaces of that portion of the cylinder against which the slide valve presses and which guide the slide valve, are plane surfaces, and the plane surfaces constituting the two sides of these recesses are inclined to the plane surface constituting the back of the recess, forming obtuse angles therewith. The pressure of the gas in the cylinder forces the slide valves outwardly so that the corresponding opposed plane surfaces on the back of the valve and sides of the valve are pressed firmly to engagement, making an automatic packing or a gas-tight joint.

Instead of forming the back of the slide valve so as to present three faces or plane surfaces for engagement with the recess in the cylinder wall, the valve and the recess may be formed of other surfaces of which some, but not all may be plane surfaces, and the proportions and angles may vary without departing from the spirit of my invention, but What I desire to secure by Letters Patent is:

1. In an internal combustion engine, in combination, a cylinder provided with inlet and outlet ports, recesses formed in the walls of said cylinder open to the combustion chamber and connected with said ports, a valve inserted in said cylinder from within and removable from the inner wall of the cylinder and adapted to slide longitudinally of the cylinder in each recess and having flat outer or back surfaces in engagement with correspondingly plane or flat surfaces in the recesses, means within the cylinder for holding each valve in its recess and means to actuate said valves.

2. In an internal combustion engine, in combination, a cylinder provided with a port near its head, a piston in said cylinder, a valve adapted to move longitudinally of said piston, a recess in the wall of the cylinder open to the combustion chamber in which said valve is adapted to move, having a flat back or bottom and inclined flat sides diverging from the back wall of the recess to the cylinder, said valve having flat sides to engage the flat diverging sides of the recess, and means for actuating said valve.

3. In an internal combustion engine, in combination, a cylinder having a port near its head end, a piston in said cylinder supported by the walls of said cylinder, a recess formed in and longitudinal of the wall of the cylinder, a valve in said recess having a cross-section longitudinal to its moving axis of a curvature fitting the piston on the inside, and a flat or plane surface constituting the back of said valve and means for actuating said valve.

4. In an internal combustion engine, in combination, a cylinder provided with a port, a longitudinal recess in the wall of said cylinder connecting with said port, the slide valve adapted to move in said recess having a uniform inner surface extending throughout its length and a uniform outer surface and having sides comprising symmetrical surfaces one with the other not contiguous with the plane of either the back or front surface, but of shape whereby the sides or edges form a divergent angle from the back to the front or piston side of said valve, the sides of said recess formed to fit the shape of the sides of the valve substantially for the purpose described.

5. In an internal combustion engine, in combination, a cylinder, a recess formed from the inner surface of the cylinder wall and extending longitudinally with uniform cross-section and having sides converging from the inner cylinder surface outwardly, at least one surface of said recess being a plane surface, a valve adapted to fit said recess and having its inner side concentric with the surface of the piston, means within the cylinder for holding the valve in its recess and means for longitudinally reciprocating said valve.

In testimony whereof I have signed my name to this specification in the presence of two subscribing witnesses.

MARTIN FISCHER.

Witnesses:
JOHANNES ARMUND,
CARL GUBLER.

Copies of this patent may be obtained for five cents each, by addressing the "Commissioner of Patents, Washington, D. C."